(12) United States Patent
Amsterdam et al.

(10) Patent No.: US 10,740,533 B2
(45) Date of Patent: *Aug. 11, 2020

(54) MANAGING WEB PAGE IMAGES ON A WEB PAGE SERVER SYSTEM

(71) Applicant: International Business Machines Corporation, Armonk, NY (US)

(72) Inventors: Jeffrey D. Amsterdam, Roswell, GA (US); Joseph S. Mabry, Canton, GA (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/403,281

(22) Filed: Jan. 11, 2017

(65) Prior Publication Data

US 2017/0124028 A1    May 4, 2017

Related U.S. Application Data

(63) Continuation of application No. 12/260,610, filed on Oct. 29, 2008, now Pat. No. 9,582,596.

(51) Int. Cl.
*G06F 17/00* (2019.01)
*G06F 40/103* (2020.01)
(Continued)

(52) U.S. Cl.
CPC .......... *G06F 40/103* (2020.01); *G06F 16/958* (2019.01); *G06F 16/9566* (2019.01); *G06F 16/9577* (2019.01); *G06T 1/0007* (2013.01)

(58) Field of Classification Search
CPC .............. G06F 11/0781; G06F 17/211; G06F 16/9577; G06F 16/9566; G06F 16/958; G06T 1/0007
(Continued)

(56) References Cited

U.S. PATENT DOCUMENTS 5,774,642 A    6/1998  Flon et al.
6,182,278 B1   1/2001  Hamada et al.
(Continued)

OTHER PUBLICATIONS

Office Action (dated Mar. 9, 2011) for U.S. Appl. No. 12/260,610, filed Oct. 29, 2008.
(Continued)

*Primary Examiner* — Laurie A Ries
(74) *Attorney, Agent, or Firm* — Schmeiser, Olsen & Watts, LLP; William Hartwell

(57) ABSTRACT

A method and associated system for managing web page images. After detection of a modification to a web page, the method attempts but fails to retrieve an image from a first location pointed to by a path included in a first link in a list of links included in the web page and in response, an image placeholder is stored at the first location. A request, for a replacement image to replace the image placeholder at the first location, is published. The request specifies that the replacement image must have specified resolution dimensions and a larger size than a size of the image placeholder. The replacement image, which is received in response to the request, is determined to have the specified resolution dimensions and a larger size than the size of the image placeholder and in response, the image placeholder is replaced with the replacement image at the first location.

20 Claims, 8 Drawing Sheets

(51) Int. Cl.
*G06F 16/958* (2019.01)
*G06F 16/955* (2019.01)
*G06F 16/957* (2019.01)
*G06T 1/00* (2006.01)

(58) Field of Classification Search
USPC ........................................................ 715/208
See application file for complete search history.

(56) References Cited

U.S. PATENT DOCUMENTS

| | | | |
|---|---|---|---|
| 7,143,193 B1 | 11/2006 | Abbott et al. | |
| 7,216,149 B1 | 5/2007 | Briscoe et al. | |
| 7,231,445 B1 | 6/2007 | Aweya et al. | |
| 7,702,684 B2* | 4/2010 | Unz | H04N 21/21 707/758 |
| 7,890,092 B2* | 2/2011 | Bruno | G06F 16/9577 455/420 |
| 2002/0023158 A1 | 2/2002 | Polizzi et al. | |
| 2006/0248192 A1 | 11/2006 | Morris et al. | |
| 2007/0162842 A1* | 7/2007 | Ambachtsheer | G06F 17/211 715/205 |
| 2007/0204210 A1* | 8/2007 | Gormish | H04N 1/00214 715/203 |
| 2007/0266145 A1* | 11/2007 | Nesbitt | G06F 16/958 709/224 |
| 2007/0282859 A1 | 12/2007 | Charvet | |
| 2008/0040424 A1 | 2/2008 | Hines | |
| 2008/0172608 A1* | 7/2008 | Patrawala | G06F 16/958 715/255 |
| 2009/0217352 A1* | 8/2009 | Shen | G06F 21/6218 726/3 |
| 2009/0254529 A1* | 10/2009 | Goldentouch | G06F 17/241 |
| 2009/0282327 A1* | 11/2009 | Hamilton, II | G06F 16/9577 715/231 |
| 2010/0107047 A1 | 4/2010 | Amsterdam et al. | |
| 2010/0107091 A1* | 4/2010 | Amsterdam | G06F 16/958 715/760 |
| 2010/0316302 A1* | 12/2010 | Lueck | G06F 16/9577 382/229 |
| 2013/0138774 A1* | 5/2013 | Barger | G06F 17/27 709/217 |
| 2017/0103050 A9* | 4/2017 | Underwood | G06Q 30/0641 |

OTHER PUBLICATIONS

Amendment (dated Jun. 8, 2011) for U.S. Appl. No. 12/260,610, filed Oct. 29, 2008.
Final Office Action (dated Jul. 28, 2011) for U.S. Appl. No. 12/260,610, filed Oct. 29, 2008.
Office Action (dated Jul. 14, 2011) for U.S. Appl. No. 12/260,696.
RCE and Amendment (dated Nov. 23, 2011) for U.S. Appl. No. 12/260,610, filed Oct. 29, 2008.
Final Amendment (dated Dec. 27, 2011) for U.S. Appl. No. 12/260,610, filed Oct. 29, 2008.
Advisory Action (dated Dec. 7, 2011) for U.S. Appl. No. 12/260,610, filed Oct. 29, 2008.
Office Action (dated Jun. 25, 2012) for U.S. Appl. No. 12/260,610, filed Oct. 29, 2008.
Office Action (dated Jun. 26, 2012) for U.S. Appl. No. 12/260,696.
Amendment (dated Sep. 25, 2012) for U.S. Appl. No. 12/260,610, filed Oct. 29, 2008.
Final Office Action (dated Jan. 17, 2013) for U.S. Appl. No. 12/260,610, filed Oct. 29, 2008.
RCE and amendment (dated Apr. 17, 2013) for U.S. Appl. No. 12/260,610, filed Oct. 29, 2008.
Final Office Action (dated Jan. 18, 2013) for U.S. Appl. No. 12/260,696.
Office Action (dated Oct. 8, 2013) for U.S. Appl. No. 12/260,610, filed Oct. 29, 2008.
Amendment (dated Nov. 4, 2013) for U.S. Appl. No. 12/260,610, filed Oct. 29, 2008.
Office Action (dated Oct. 9, 2013) for U.S. Appl. No. 12/260,610.
Final Office Action (dated Nov. 13, 2013) for U.S. Appl. No. 12/260,610, filed Oct. 29, 2008.
"HTML HEAD elements," Chapter 12. HTML customizations, DocBook XSL: The Complete Guide 4th edition, copyright 2002-2007 Sagehill Enterprises, 6 pages, retrieved Sep. 30, 2013, http://www.sagehill.net/docbooks/HtmlHead.html.
Blank.gif, Retrieved Feb. 5, 2014, http://holic.wikia.com/wiki/File:Blank.gif, 1 page.
Final Office Action (dated Nov. 14, 2013) for U.S. Appl. No. 12/260,610, filed Oct. 29, 2008.
RCE and PA (dated Feb. 14, 2014) for U.S. Appl. No. 12/260,610, filed Oct. 29, 2008.
Office Action (dated Apr. 4, 2014) for U.S. Appl. No. 12/260,610, filed Oct. 29, 2008.
Amendment (dated Jun. 26, 2014) for U.S. Appl. No. 12/260,610, filed Oct. 29, 2008.
Final Office Action (dated Nov. 19, 2014) for U.S. Appl. No. 12/260,610, filed Oct. 29, 2008.
Final Amendment (dated Jan. 14, 2015) for U.S. Appl. No. 12/260,610, filed Oct. 29, 2008.
Advisory Action (dated Feb. 5, 2015) for U.S. Appl. No. 12/260,610, filed Oct. 29, 2008.
Final Amendment (dated Feb. 18, 2015) for U.S. Appl. No. 12/260,610, filed Oct. 29, 2008.
Appeal Brief (dated Apr. 15, 2015) for U.S. Appl. No. 12/260,610, filed Oct. 29, 2008.
Office Action (dated Sep. 25, 2015) for U.S. Appl. No. 12/260,610, filed Oct. 29, 2008.
Amendment (dated Dec. 28, 2015) for U.S. Appl. No. 12/260,610, filed Oct. 29, 2008.
Office Action (dated Apr. 21, 2016) for U.S. Appl. No. 12/260,610, filed Oct. 29, 2008.
Amendment (dated Jul. 21, 2016) for U.S. Appl. No. 12/260,610, filed Oct. 29, 2008.
Notice of Allowance (dated Oct. 13, 2016) for U.S. Appl. No. 12/260,610, filed Oct. 29, 2008.
312 amendment (dated Nov. 17, 2016) for U.S. Appl. No. 12/260,610, filed Oct. 29, 2008.

* cited by examiner

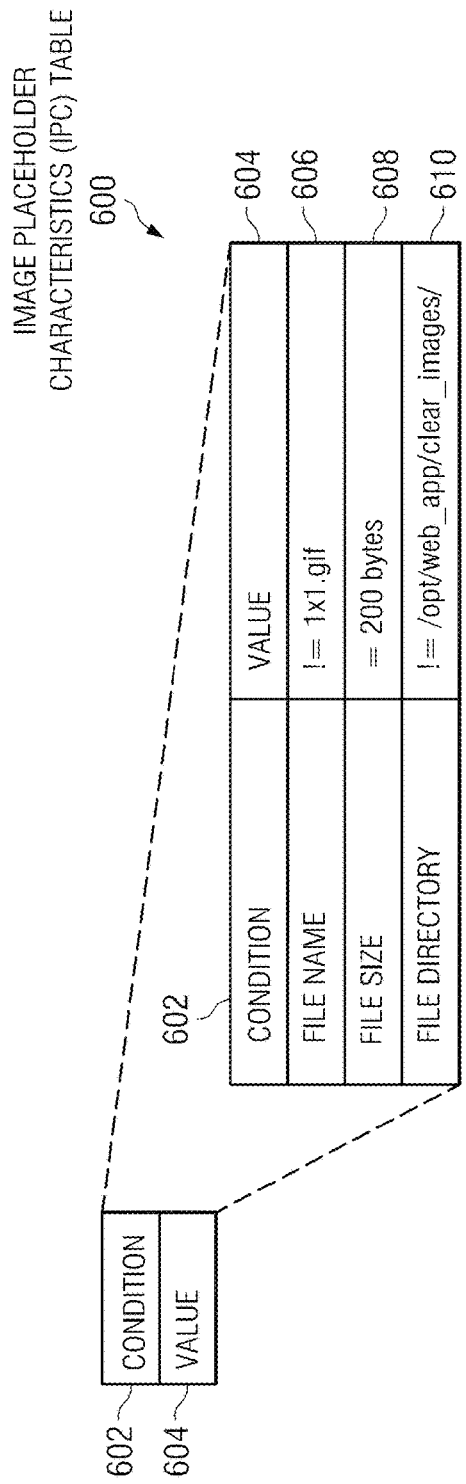
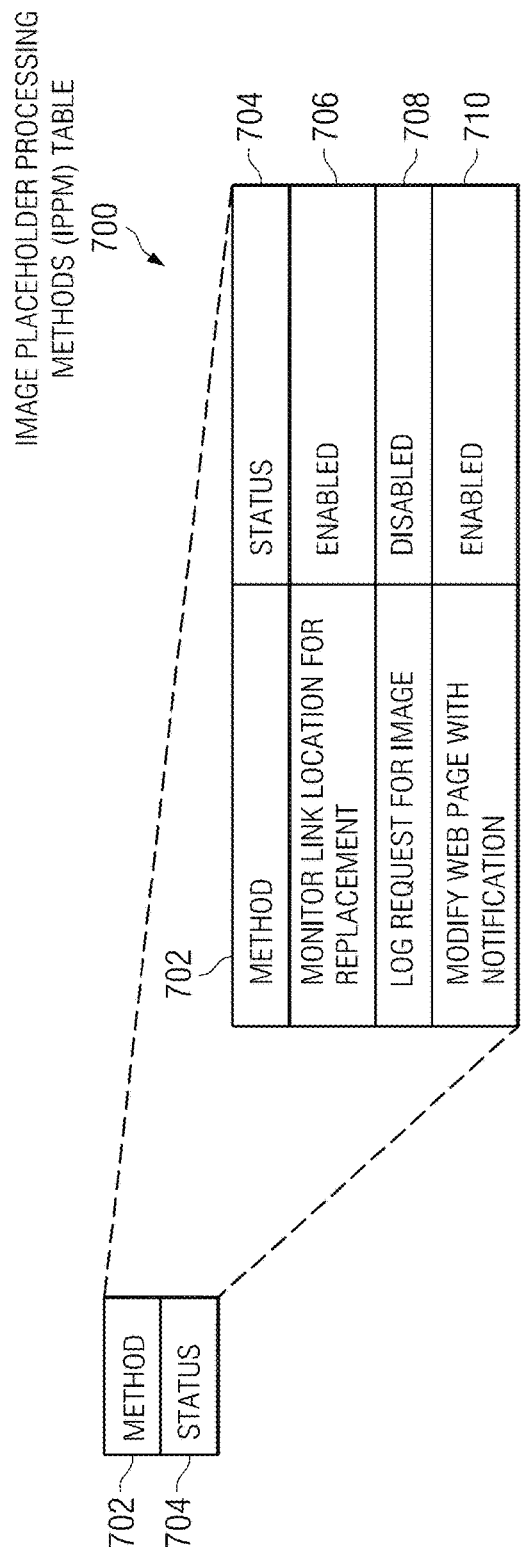
FIG. 6
FIG. 7

US 10,740,533 B2

MANAGING WEB PAGE IMAGES ON A WEB PAGE SERVER SYSTEM

This application is a continuation application claiming priority to Ser. No. 12/260,610, filed Oct. 29, 2008, now U.S. Pat. No. 9,582,596 issued Feb. 28, 2017.

BACKGROUND OF THE INVENTION

1. Field of the Invention

The present invention relates generally to web services publishing and hosting environments, and more specifically to preventing web server error codes on dynamically loaded missing images in a web page.

2. Description of the Related Art

For every request to a web server, the web server responds with a return status code. Hypertext Transport Protocol (HTTP) status codes returned by a web server can provide useful information to dynamic web applications. An application that analyzes these return codes may branch into different functionality based on the return code. Some of these codes, such as the Not Found error message (404) are also used by server administrators to diagnose server issues. While 404 errors can reveal a number of problems including server issues, publishing path issues, or back-end web site programming issues, the monitoring of an excessive number of non-problematic 404 errors can waste valuable time and resources, since non-problematic error codes may cloud actual 404 errors that the server administrators are looking for and seeking to fix. This situation may arise, for example, when an application on a web site attempts to load a set of dynamically defined images based on programmatically generated lists that are passed to the applications. Some or all of the images listed actually may not be available on the website until some time after the list has been generated. The application does not know which images exist and which do not exist, and therefore checks for an error code, such as a 404 error, on the image load. The application may invoke one set of methods if the image exists, and another set of methods if the image does not exist. However, the non-existence of the image is not an exception condition for the application. This application tactic may result in an excessively high number of non-problematic server error codes being generated when an application tries to load images that may not exist on the server.

BRIEF SUMMARY OF THE INVENTION

The illustrative embodiments provide a mechanism for determining if images exist before publishing to a web server, and replacing missing images with temporary images for the purpose of providing alternate content while eliminating web server error responses, which prevents needless alerts to site administrators. Upon detecting a modification to a web page, a determination is made as to whether the modification includes a link to an image that does not exist at a location specified by a path in the link to the image. Responsive to a determination that the modification includes a link to an image that does not exist at the location, an image placeholder is created for the image at the location.

BRIEF DESCRIPTION OF THE SEVERAL VIEWS OF THE DRAWINGS

FIG. 6 illustrates an exemplary image placeholder characteristics (IPC) table in accordance with the illustrative embodiments;

FIG. 7 illustrates an exemplary image placeholder processing methods (IPPM) table in accordance with the illustrative embodiments;

DETAILED DESCRIPTION OF THE INVENTION

Figure 1:
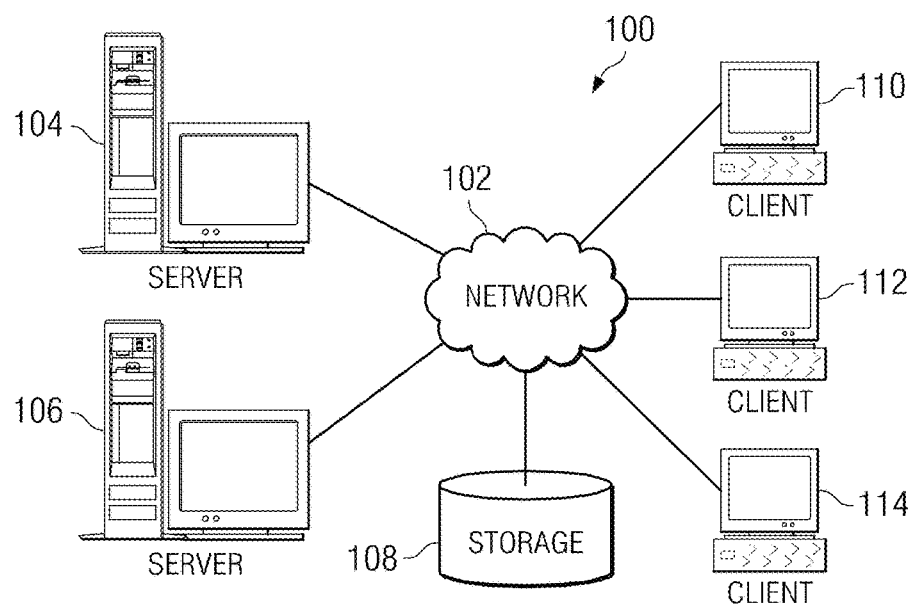
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable devices(s) may be utilized. The computer-usable or computer-readable device may be, for example but not limited to, an electronic, magnetic, optical or semiconductor system, apparatus, or device. More specific examples (a non-exhaustive list) of the computer-readable device would include the following: a portable computer diskette, a hard disk, a random access memory (RAM), a read-only memory (ROM), an erasable programmable read-only memory (EPROM or Flash memory) a portable compact disc read-only memory (CDROM), an optical storage device, or a magnetic storage device. In the context of this document, a computer-usable or computer-readable device may be any device that can contain, store, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable device that can direct a computer or other programmable data processing apparatus to function in a particular manner, such that the instructions stored in the computer-readable device produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
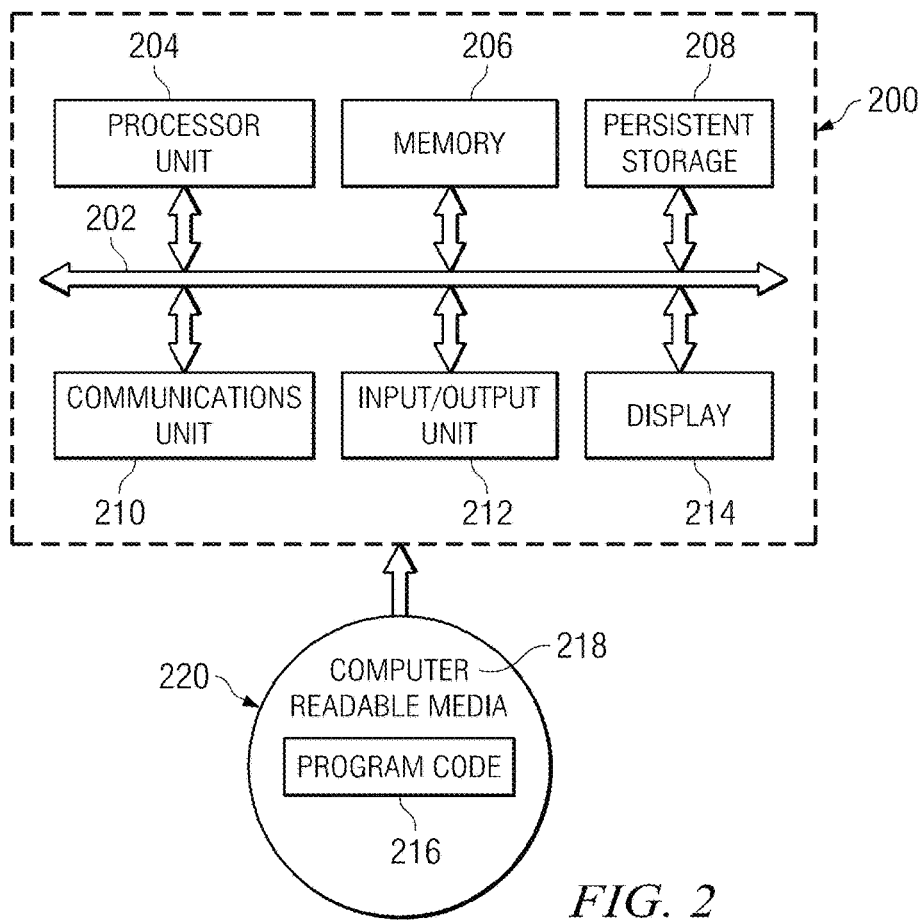
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media devices, such as memory 206 or persistent storage 208.

Program code 216 is located in a functional form on computer readable devices 218 that is selectively removable and may be loaded onto or transferred to data processing system 200 for execution by processor unit 204. Program code 216 and computer readable devices 218 form computer program product 220 in these examples. In one example, computer readable devices 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable devices 218 also may take the form of a persistent storage, such as a hard drive, a thumb drive, or a flash memory that is connected to data processing system 200. The tangible form of computer readable devices 218 is also referred to as computer recordable storage devices. In some instances, computer recordable devices 218 may not be removable.

Alternatively, program code 216 may be transferred to data processing system 200 from computer readable devices 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable devices 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Aspects of the illustrative embodiments recognize that a conflict may arise between developers wanting to use an error code programmatically and server administrators seeking to eliminate server error codes as part of a healthy server environment. As previously mentioned, this situation may occur when an application on a web site attempts to load a set of dynamically defined images based on programmatically generated image lists that are passed to the applications. The application uses links in the image list to locate corresponding images stored on a file system to display on the web site. Since some or all of the images listed may not be available on the web site until some time after the image list has been generated, the application checks for an error code, such as a 404, on the image load. As a result, an excessively high number of server error codes may be returned when an application tries to load images that may not exist on the server.

One solution for reducing an excessive number of error codes is to use flags in the programmatically generated image list which are continuously updated to identify the existence or nonexistence of each image. However, this solution requires the lists to be generated frequently and requires the application to load a new image list before the attempted loading of an image on the web site. In addition, this solution requires additional files, bandwidth, and complexity.

The illustrative embodiments provide a mechanism for reducing an excessive number of error codes without the overhead required using flags to identify the existence or nonexistence of each image in a continuously updated image list. The mechanism of the illustrative embodiments generates a small image, or image placeholder, with the same name as the non-existent image. A backend process which generates a list of images for the application may check the network file system to determine if the images in the programmatically generated list exist in the network file system. If the backend process determines that an image in the list does not exist in the file system (i.e., a non-existent image), the backend process creates an image placeholder for the non-existent image in the list and stores it in the file system. When the backend process initiates the web application, the application may use the generated list for the image names to load the images from the file system dynamically. To the consuming application, the small size of the created image placeholders is one example indicator of the non-existence of the proper image. An application programmed to detect these image placeholders may display a standard pre-loaded graphic, or take alternate action as specified. Some example web applications that require the dynamic loading of images include a web application for a sports tournament showing athlete images or a web application for publishing news showing many images related to the news. In these examples, some athlete images and news images may not be available at the start of the tournament or when the news is first published, which would normally lead to web server error codes when requested by the application. The mechanism of the illustrative embodiments prevents the generation of these error codes.

The mechanism in the illustrative embodiments provides a more efficient solution by alerting a web application as to which images are available for displaying on a web site and which images are not available before the application attempts to load the images. The mechanism in the illustrative embodiments leverages an application's ability to inspect loaded images to determine if the actual image was loaded or if an image placeholder was loaded, thereby requiring alternate steps to be performed. The mechanism provides several advantages over existing solutions in that, with the illustrative embodiments, an application does not have to continuously load the programmatically generated image list prior to the attempted loading of listed images each time that an image needs to be displayed. Instead, the application will load an image with a filename as specified by the generated list or any other method used for identifying image names. The image with this name may be the actual image or the image placeholder. The backend process that generates the image list does not have to continuously generate/update the image list to reflect changes to actual image availability; rather, the process only has to create image placeholders when new images are added to the image list.

Furthermore, the illustrative embodiments also provide a mechanism for obtaining a replacement image for an image placeholder in a web page by publishing a request for the replacement image. This embodiment may be implemented when an image placeholder is created by the backend process for a non-existent image in the generated list of images for the application and stored at a location such as the file system. In this embodiment, Once an image placeholder is stored at the location, a request component publishes a request for the actual replacement image. One method of publishing the request for the replacement image may comprise sending the request over email or to a Rich Site Summary, RDF Site Summary, or Really Simple Syndication (various version names of RSS) feed (or other syndicate feed) to which image creators and image obtainers may subscribe. Another method of publishing the request comprises including metadata in Hypertext Markup Language (HTML) headers on the web page itself, wherein a modified browser or a browser plugin may detect the metadata and allow the user to see the need for the image and interact with the metadata. A third method of publishing the request comprises sending the request to a repository that users may view, such as a web forum. Users may receive the published request and may opt to fulfill the request by creating or obtaining the requested image. The image placeholder may then be replaced at the location if the image passes review, such as an automated review based on a specified criteria, or such as a manual content owner review.

Figure 3:
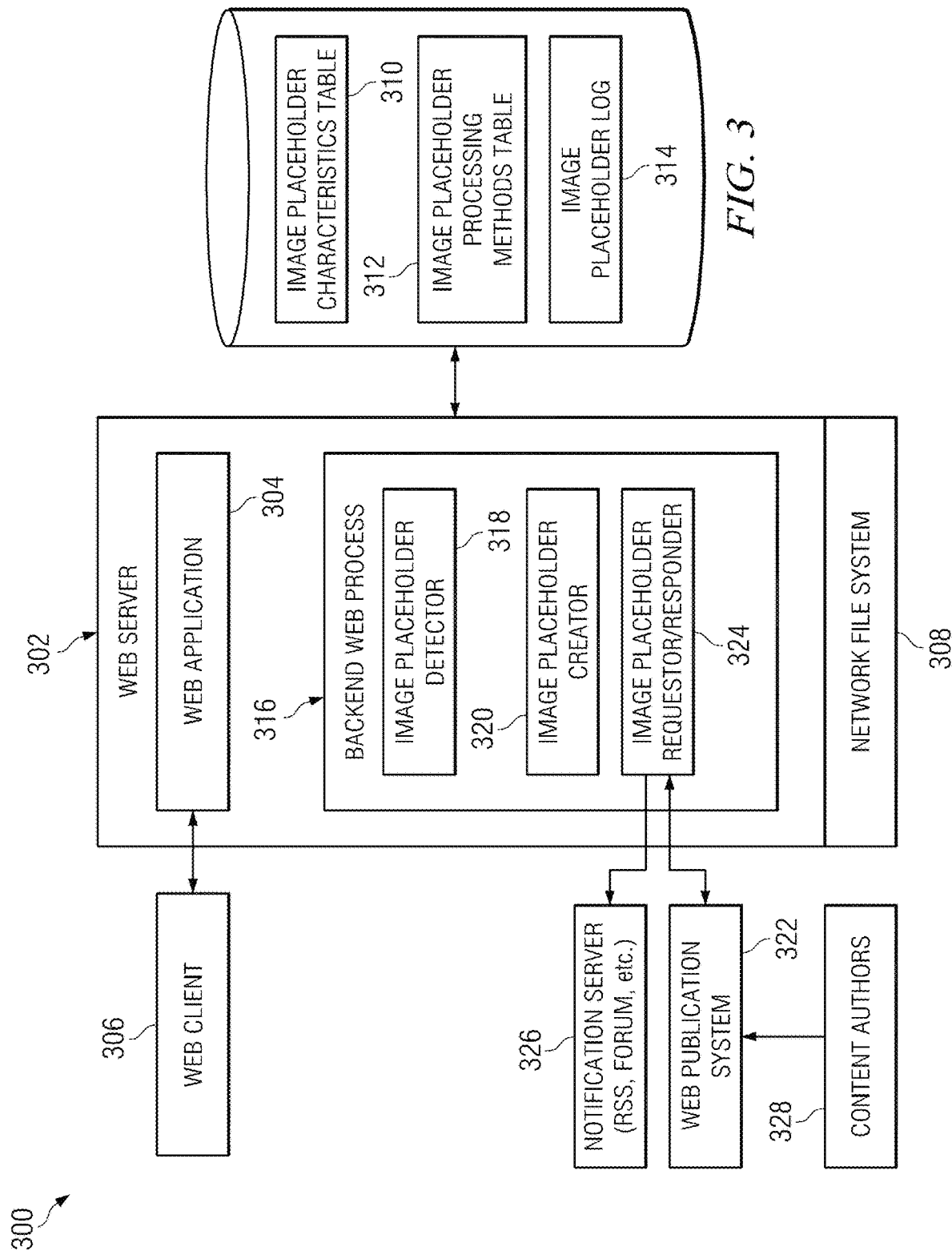
FIG. 3 is a high level block diagram that illustrates an exemplary web services publishing and hosting environment in accordance with the illustrative embodiments.

FIG. 3 is a high level block diagram that illustrates an exemplary web services publishing and hosting environment in accordance with the illustrative embodiments. Within web services environment 300, web server 302 is an example server-side data processing system, such as server 104 and 106 in FIG. 1. In this example, web server 302 is a web service provider that hosts any number of web applications, such as web application 304. Web application 304 provides web pages upon request to web client 306, wherein the web pages comprise links to images stored in network file system 308. When web application 304 attempts to load an image in a web page, web application 304 uses the links to retrieve either the actual version of the image or the image placeholder for the image from network file system 308. Before displaying the retrieved image, web application 304 checks various characteristics of the loaded image within image placeholder characteristics table 310 to determine if the image is a non-existent image (image placeholder) or an existent image (actual image). For example, an image with a small number of bytes loaded into memory may indicate to the application that an image placeholder, rather than the actual image, was retrieved. If web application 304 determines that an actual image has been retrieved and loaded, web application 304 displays the actual image. However, if web application 304 determines that an image placeholder has been retrieved and loaded, web application 304 may branch to alternative steps of process logic as specified in image placeholder processing methods table 312. Each time web application 304 requests an image placeholder, web application 304 may log the request to image placeholder log 314.

Backend web process 316 is a program that creates image placeholders as needed, such as when a modification has been made to a web page and the corresponding actual image is not yet available for display. Backend web process 316 comprises an image placeholder detector 318 that checks the images present in network file system 308 against the generated list of images for the web page to determine if each image listed for the web page actually exists in network file system 308. If backend web process 316 determines that an image in the list for the web page does not actually exist in network file system 308, backend web process 316 comprises an image placeholder creator 320 which creates an image placeholder for the non-existent image and stores the image placeholder in network file system 308. At a later time when the actual image is available, backend web process 316 may replace the image placeholder in network file system 308 with the actual image. Thus, the next time the image is loaded by web application 304, web application 304 may check the characteristics of the loaded image and determine that the size of the loaded image is much larger. The web application logic would detect this larger image as the correct actual image to display in the web page.

Image placeholder requestor/responder 324 in web server 302 responds to incoming images from image placeholder detector 318 and web publication system 322. When backend web process 316 creates an image placeholder for a non-existent image in a web page and stores the image placeholder in network file system 308, backend web process 316 collects data that describes the non-existent image in the web page. Backend web process 316 then notifies image placeholder requestor/responder 324 that an image placeholder has been created, and image placeholder requestor/responder 324 sends a request for a replacement image for the image placeholder via notification server 326. Notification server 326 announces the need for a replacement image. When content authors 328 receive the published request for a replacement image, content authors 328 may provide the requested replacement image to the requesting component, such as by uploading with a web form, File Transfer Protocol (FTP) client, email, etc. Web publication system 322 provides an interface to content authors 328 and passes the replacement images to image placeholder requestor/responder 324. Image placeholder requestor/responder 324 receives the replacement image and verifies that the content of the image meets specific criteria for the image. If the image replacement is a suitable replacement for the image placeholder, image placeholder requestor/responder 324 replaces the image placeholder in network file system 308 with the image replacement. Thus, when the web page is requested by web application 304, the replacement image is now loaded with the web page, rather than the image placeholder. Image placeholder requestor/responder 324 may also send a request back to notification server 326 and web publication system 322 to allow notification server 326 and web publication system 322 to delete or update the status for a replacement image.

FIG. 3 is intended as an example, and not as an architectural limitation for the different illustrative embodiments. Other components shown in FIG. 3 can be varied from the illustrative examples shown. For instance, in one embodiment, backend web process 316 and/or notification server 326 may be a sub-component of web publication system 322.

Figure 4:
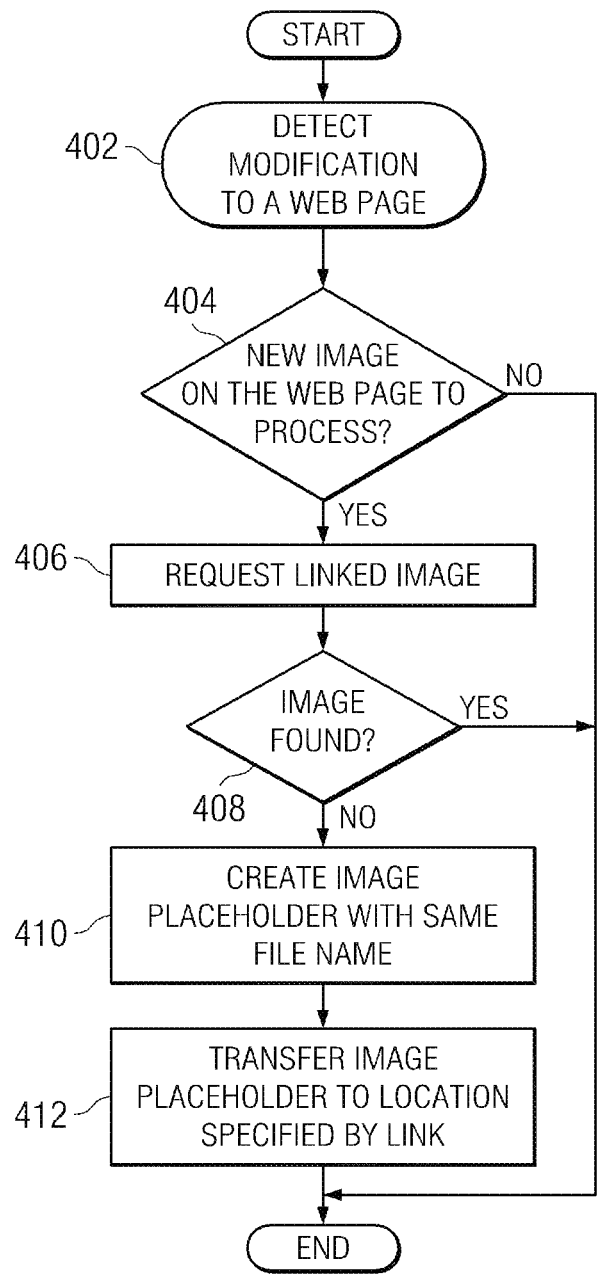
FIG. 4 is a flowchart of a process for creating an image placeholder in accordance with the illustrative embodiments.

FIG. 4 is a flowchart of a process for creating an image placeholder in accordance with the illustrative embodiments. The process described in FIG. 4 may be implemented by a backend web process in the web server, such as backend web process 316 in FIG. 3. The process begins when the backend process detects that a modification has been made to a web page (step 402). A modification to a web page may occur when a web page developer updates the content, specifically the image links, on the web page. The image links in the web page may be processed as described in steps 404-412.

The backend process examines the list of images for the web page and makes a determination as to whether the list contains any new images to process (step 404). If there are no new images listed in the image list for the web page ('no' output of step 404), the process terminates thereafter. However, if there are new images in the image list for the web page ('yes' output of step 404), the backend process uses the links in the image list to send a request to the file system for the linked images (step 406). In other words, the backend process uses the links to download the corresponding images in the file system to memory.

The backend process then makes a determination as to whether images corresponding to the new image links in the image list have been found in the file system (i.e., whether all new images have been downloaded into memory) (step 408). If all of the images have been found ('yes' output of step 408), the process terminates thereafter. However, if one or more images are not found in the file system ('no' output of step 408), the backend process creates an image placeholder with the same name as represented by the link for the non-existent image (step 410). The image placeholder comprises a small (e.g., 1 pixel by 1 pixel) image. The backend process then transfers the image placeholder to the file system location represented by the location's path specified in the link (step 412). The transfer may comprise moving the image placeholder, copying the image placeholder, or sending the image placeholder via any file transfer method, including File Transfer Protocol, NFS, Samba, Telnet, mapped drive, etc. For example, a 404 link to "http://server.com/images/new_image1.jpg" may be transferred to the path the link represents, such as "/opt/web_app/images/new_image1.jpg". The new image placeholder is now accessible to the web services applications, such as web application 304 in FIG. 3.

Figure 5:
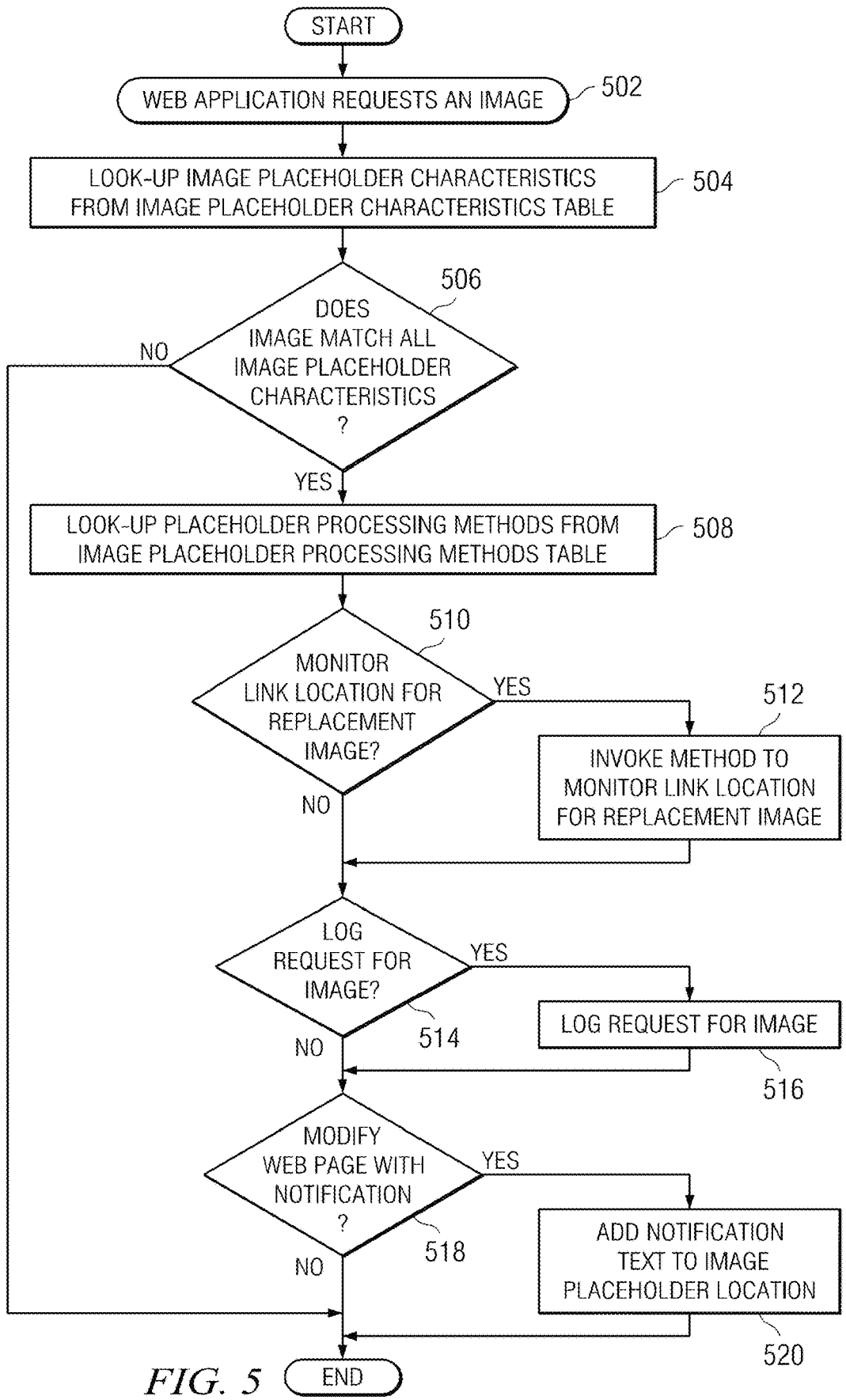
FIG. 5 is a flowchart of a process for querying an image placeholder in accordance with the illustrative embodiments.

FIG. 5 is a flowchart of a process for querying an image placeholder in accordance with the illustrative embodiments. The process described in FIG. 5 may be implemented by web services application, such as web application 304 in FIG. 3. The process begins when the application sends a request for an image (step 502). One example is when a user requests a web page that contains images. In the request, the application performs a lookup to the Image Placeholder Characteristics (IPL) table (step 504). Image Placeholder Characteristics (IPL) table may be implemented in a database, or in a flat file, or in both where configuration data and log data may be kept. Examples of flat file extensions are: .txt, .cvs, .xml, .ini., .config, .conf, .properties, etc. Image Placeholder Characteristics table is described further in FIG. 6.

Using the Image Placeholder Characteristics table, a determination is then made by the application as to whether an image in the web page matches all of the required characteristics (e.g., image size, etc.) of an image placeholder as defined in the table (step 506). If any of the characteristics in the Image Placeholder Characteristics table are not met ('no' output of step 506), the process terminates thereafter. However, if all of the characteristics in the Image Placeholder Characteristics table are met ('yes' output of step 506), the application determines that the image is an image placeholder and performs a lookup to the Image Placeholder Processing Methods (WPM) table (step 508). Like Image Placeholder Characteristics table, Image Placeholder Processing Methods table may be implemented in a database, or in a flat file, or in both where configuration data and log data may be kept. Image Placeholder Processing Methods table is described further in FIG. 7.

The application performs a lookup to the Image Placeholder Processing Methods table to determine the methods the process should apply when the web page the user has requested comprises an image placeholder. These actions may include, for example, monitoring the link location for the replacement of the image placeholder, logging the request for the image, replacing the image placeholder with notification to the user, or any combination of these actions. If there are additional or fewer methods implemented, additional or fewer steps may be required in the process accordingly. It should be noted that the order in which these methods in the Image Placeholder Processing Methods table are invoked does not matter.

In the lookup to the Image Placeholder Processing Methods table, in this example, a determination is first made by the application as to whether the table specifies that the action to be taken in response to a request for an image placeholder is to monitor the link location in the generated list of images for a replacement image (step 510). Monitoring the link location allows for detecting when the image placeholder has been replaced with the actual image. In one example, a notification of the image replacement may be sent to users who have subscribed to a "notify me when image available" feature on the web page. In another example, upon determining that the image placeholder is now replaced with the actual image, a notification may be sent to administrators, managers, site owners, image content developers, web page content developers, etc. who may have indicated concern for an image. The concern may have been registered, for example, by clicking the image replacement in a content edit or monitor view of the web site, or by selecting an image as queried and displayed from the Image Placeholder Log (LPL) table, or by a web publication application preference to be notified of specific or all image placeholders. In embodiments which implement an Image Placeholder Request Log method described further in FIGS. 8 and 9, the link location monitoring method may also be used in combination with the logging requests for images method to delete the image placeholders from the Image Placeholder Request Log table that have been replaced. Notification may take any form known in the art, such as email, instant messaging, paging, SMS, and the like.

If the table does not specify that the action to be taken in response to a request for an image placeholder is to monitor the link location in the generated list of images for a replacement image ('no' output of step 510), the process continues to step 514. However, if the table specifies that the action to be taken in response to a request for an image placeholder is to monitor the link location in the generated list of images for a replacement image ('yes' output of step 510), the application invokes a method for monitoring the link location to determine when a replacement image exists in the file system (step 512). The process then continues to step 514.

At step 514, a determination is then made by the application as to whether the Image Placeholder Processing Methods table specifies that the action to be taken in response to a request for an image placeholder is to log the request for the image (step 514). The number of logged requests for the image may be used for reports and to notify an image content owner team of relative priorities of which images need to be created and assist in prioritizing the work of the image content owners. For example, there may be a relatively large number of requests for image A because the image appears on the home page, as compared to image B because the image appears on a web page deep into the site's hierarchy or is on a page not often visited. Managers, administrators, and image content owners may benefit from knowing which images would have a greater impact in terms of being consumed by more users. They may then prioritize their workload by providing the actual images to those images that are requested more frequently than lesser-requested images.

If the table does not specify that the action to be taken in response to a request for an image placeholder is to log the request ('no' output of step 514), the process continues to step 518. However, if the table specifies that the action to be taken in response to a request for an image placeholder is to log the request ('yes' output of step 514), the application logs the request for the image (step 516), which is described in further detail in FIG. 8. The process then continues to step 518.

At step 518, a determination is then made by the application as to whether the Image Placeholder Processing Methods table specifies that the action to be taken in response to a request for an image placeholder is to modify the web page with notification (step 518). Modifying the web page with notification allows for displaying notification text or a notification image as a substitute for a non-existent image. For example, rather than display a blank image on the web page or nothing at all, text may be put at the place where the image was missing, such as, "Image coming soon" or "news1.jpg coming soon." In addition, the modifying a web page with notification method may be used in combination with the link location monitoring method to enable a user to subscribe to be notified (such as via email, IM, etc.) when an image placeholder is replaced with the actual image.

If the table does not specify that the action to be taken in response to a request for an image placeholder is to modify the web page with notification ('no' output of step 518), the process terminates thereafter. However, if the table specifies that the action to be taken in response to a request for an image placeholder is to modify the web page with notification ('yes' output of step 518), the application adds the notification text and/or notification images to the image placeholder location on the web page (step 520). The process then terminates thereafter.

FIG. 6 illustrates an exemplary Image Placeholder Characteristics (IPC) table in accordance with the illustrative embodiments. The Image Placeholder Characteristics table is used in steps 504 and 506 in FIG. 5. In one exemplary embodiment, the image Placeholder Characteristics table may be implemented as a flat file, since there may not be many characteristics on which to filter. However, if there are many files or directories that are to be excluded, then a database may be preferred.

In this illustrative example, Image Placeholder Characteristics table 600 comprises a Condition field 602 and a Value field 604. Various conditions may be included in Condition field 602. Condition field 602 stores the condition names to be checked by the application program logic against the downloaded images. The conditions in Condition field 602 may have any syntax, and the program logic that reads these conditions only needs to know the condition names. Therefore, these conditions may be viewed as variables. In other embodiments, Condition field 602 values may be actual code to execute, such as scripts or macros. Value field 604 stores the value that will determine if a condition in Condition field 602 is met.

Entries 606, 608, and 610 show example conditions that may be implemented in the illustrative embodiments. As web sites may have 1×1 pixel images often named "1×1.jpg", "1×1.gif", "clear.jpg", "clear.gif", etc. used for display manipulation, these small pixel images are not actual image placeholders. Entry 606 demonstrates that the file name condition in the table may be used to filter out those small pixel images that are not image placeholders. For instance, if the file name in the image link is "1×1.gif", the program logic will determine that the image is not an image placeholder. Thus, only files that are not named "1×1.gif" may be possible image placeholders, as long as the remaining conditions in the table are also met. Entry 608 demonstrates that the program logic will determine that an image may be an image placeholder if the file is of a specific file size (e.g., 200 bytes) and as long as all of the other remaining conditions in the table are also met. Entry 610 demonstrates that, similar to entry 306, entire directories of non-existent images may be filtered out from consideration.

FIG. 7 illustrates an exemplary Image Placeholder Processing Methods (IPPM) table in accordance with the illustrative embodiments. The Image Placeholder Processing Methods table is used in steps 508, 510, 512, 514, 516, 518, and 520 in FIG. 5. In one exemplary embodiment, the Image Placeholder Processing Methods table may be implemented as a flat file, since there may not be many characteristics on which to filter. However, if there are many image placeholder processing methods, then a database may be preferred. For illustrative purposes, three methods, monitor link location for replacement 706, log request for image 708, and modify web page with notification 710 are described corresponding to steps 510, 514, and 518 in FIG. 5. However, it should be noted that other methods may be implemented, which would result in additional steps in FIG. 5, and thus additional records in the image placeholder processing methods table. For example, methods may be enabled or disabled with more granularity and options, such as according to time, to user, or to other factors.

In this illustrative example, Image Placeholder Processing Methods table 700 comprises Method field 702 and Status field 704, where the name of the method may be stored in the Method field 702, and the status of the method, whether enabled or disabled, may be stored in the Status field 704. In another embodiment, the status of the method may be implemented as a single method field in which the presence of a record in the Method field signifies that the status of the method is 'enabled'. An advantage of including Status field 704 is that this field enables toggling methods on and off. For example, the feature to "log request for image" in example 708 may not be ready to implement until a future date when a content team is prepared to make use of such logs.

Figure 8:
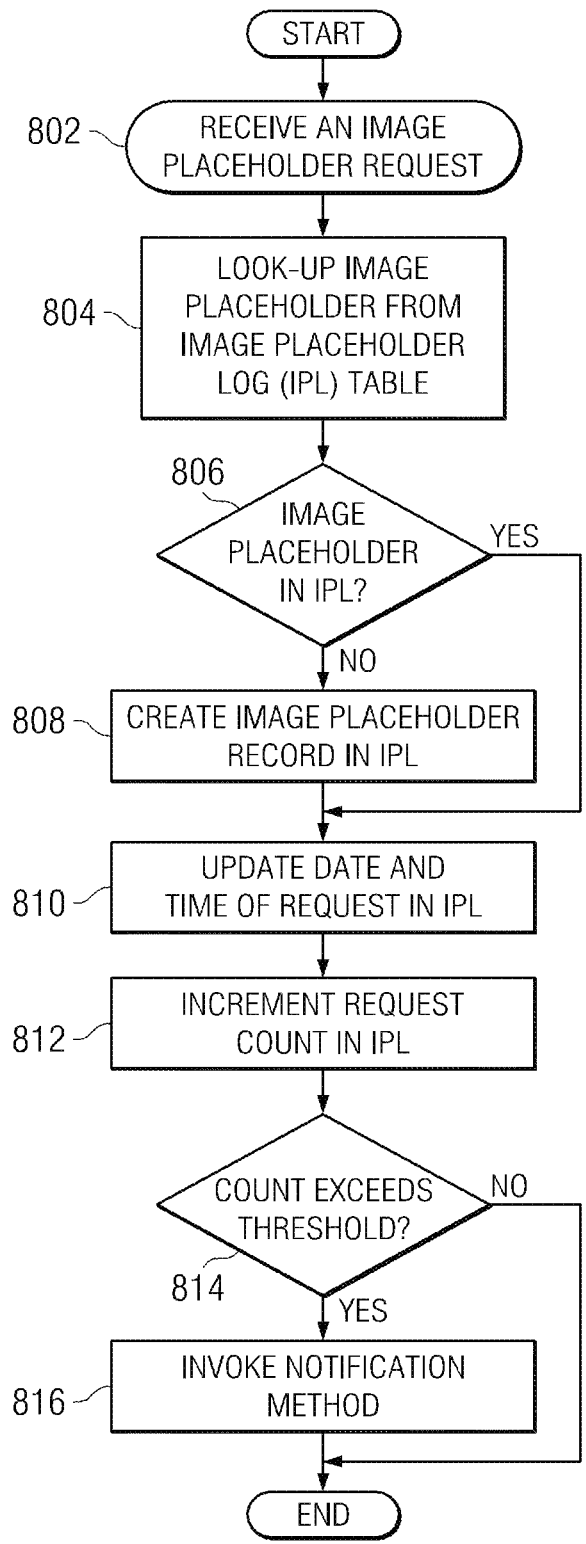
FIG. 8 is a flowchart of a process for logging a request for an image in accordance with the illustrative embodiments.

FIG. 8 is a flowchart of a process for logging a request for an image in accordance with the illustrative embodiments. The process described in FIG. 8 includes the method implemented in applications wherein the number of requests for an image placeholder may be logged and used, as invoked in FIG. 5 in step 516.

The process begins when the web application receives a request for an image placeholder, such as step 516 in FIG. 5 (step 802). The web application then looks up the image placeholder in the Image Placeholder Log table (e.g., FIG. 9, Filepath field 902) (step 804). The web application makes a determination whether the image placeholder is already logged in the Image Placeholder Log table (step 806).

If the image placeholder is already logged in the table ('yes' output of step 806), the process continues to step 810. However, if the image placeholder is not already logged in the table ('no' output of step 806), the backend process creates the image placeholder record in the table (step 808). At step 810, the backend process updates the date and time of the logged request into the table (e.g., FIG. 9, LastRequested field 906) (step 810). An advantage of tracking the time is that another process may periodically or on command purge stale records from the Image Placeholder Log table. For example, if an image placeholder has not been requested in several months, it may not be worth the time to create the image.

The backend process may then increment the request count in the Image Placeholder Log table (e.g., see FIG. 9, Requests field 904) (step 812). A determination is then made as to whether the resulting log count exceeds a specified threshold (step 814). The specified threshold may vary based on traffic to a web site, and may be changed manually or dynamically based on number of currently exceeding images. For example, a site owner may only want to send notification regarding the top ten requested images.

If the resulting log count does not exceed a specified threshold ('no' output of step 814), the process terminates thereafter. However, if the resulting log count exceeds a specified threshold ('yes' output of step 814), the backend process invokes whatever notification method is defined (step 816), with the process terminating thereafter. An example of a notification method includes sending email notices, pages, instant messages, voice mails, posting to web pages, etc. to specified distribution lists—with the ability to provide escalation granularity, such as sending notices progressively higher in an organization's hierarchy as additional thresholds are breached. In the notification method, a "next threshold" level would need to be defined to prevent sending notification for every additional request past the threshold. For example, an initial threshold may have been set at 10,000 requests, and then further notification can be sent for every additional 10,000 or 20,000 requests. The notification method provides an interface for an image content owner to be able to request the top requested image placeholders to prioritize the workload and determine which non-existent images to work on next.

Figure 9:
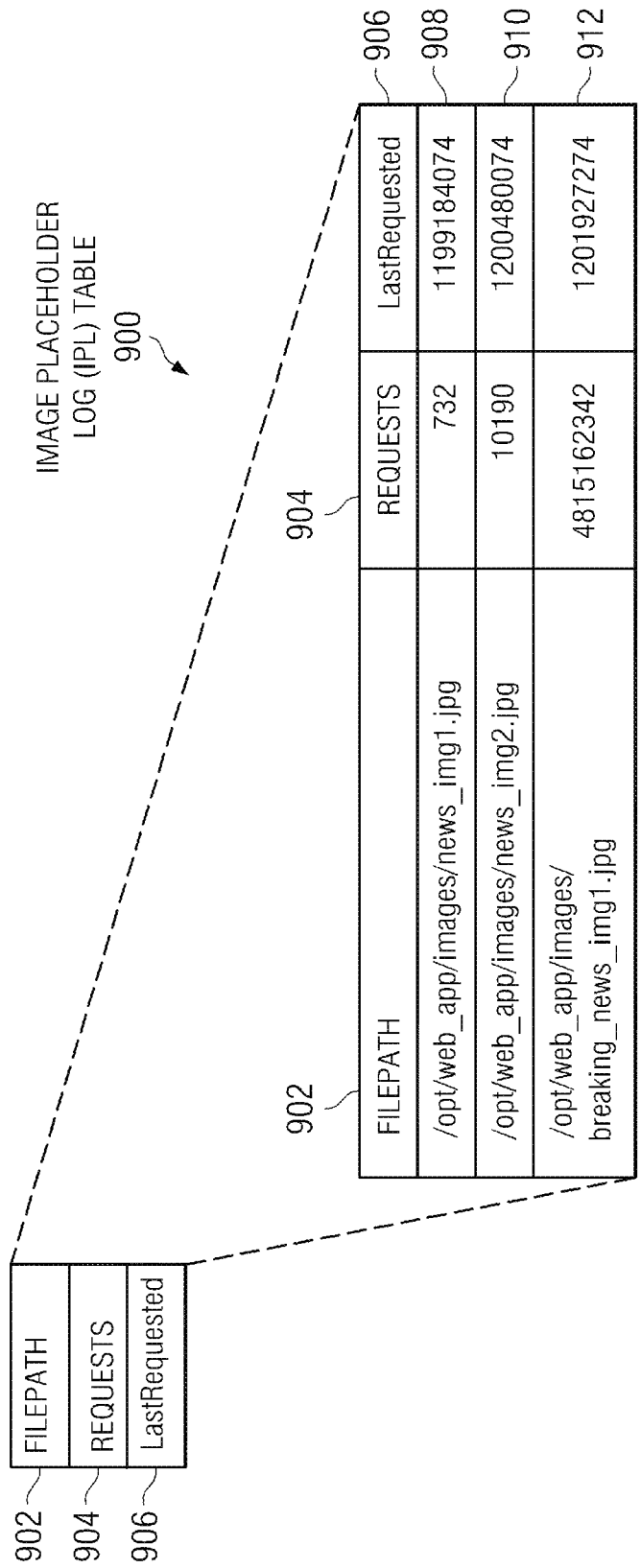
FIG. 9 illustrates an exemplary image placeholder log (IPL) table in accordance with the illustrative embodiments.

FIG. 9 illustrates an exemplary image placeholder log (IPL) table in accordance with the illustrative embodiments. The image placeholder log table is used in FIG. 8 in steps 804, 806, 808, 810, and 812. In one exemplary embodiment, the image placeholder log table may be implemented as a database, since there may be many image placeholders to process. However, if there are few images to process, then a flat file may be preferred.

In this illustrative example, image placeholder log table 900 comprises a Filepath field 902, Requests field 904, and LastRequested field 906. Filepath field 902 contains the path and image name of the image placeholder. There would be one record per unique file path. Therefore, the filepath may be seen as a primary key. Requests field 904 is a numeric count of how many times the image placeholder has been requested, which is incremented in FIG. 8 in step 812. LastRequested field 906 is a date and time signifying the last request of the image placeholder. The date and time in LastRequested field 906 is updated in FIG. 8 step 810 and, as discussed in FIG. 8, may be used for purging stale records. The format of the LastRequested field 906 may be any desired date and time convention, such as Unix time, Coordinated Universal Time (UTC), etc. The times are often converted to UTC or other display formats when shown to a user. The examples entries 908, 910, and 912 are shown in Unix time.

Figure 10:
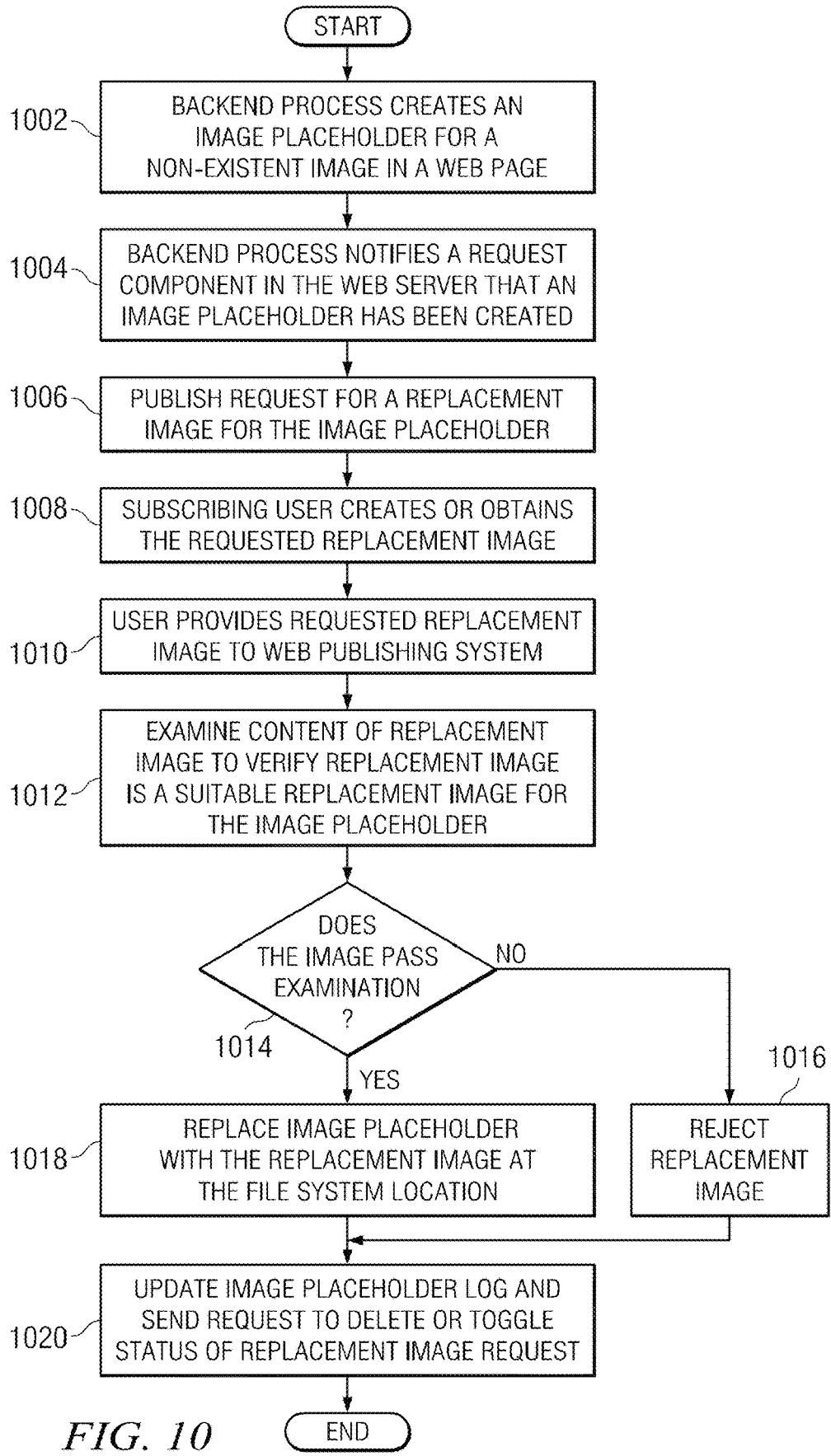
FIG. 10 is a flowchart of a process for publishing a request for a replacement image for an image placeholder.

FIG. 10 is a flowchart of a process for publishing a request for a replacement image for an image placeholder. The process described in FIG. 10 may be implemented in response to the backend process transferring an image placeholder to the file system location represented by the location's path specified in the link as described in step 412 of FIG. 4.

The process begins with the backend process creating an image placeholder for a non-existent image in a web page as described in the process in FIG. 4 and storing the image placeholder at the file system location (step 1002). When creating the image placeholder, the backend process may collect aggregated data that describes non-existent images in the web page. This aggregated data may be obtained from an image ALT tag, from the HTML text nearest the image location on the web page, or from a caption for the image on the web page. In some embodiments, the content owner may be prompted to supply a description or other instructions. The aggregated data may then be provided with the published request for an image replacement. Thus, rather than just providing the image file name in the published request, which may not provide enough description, this aggregated data may be used to provide more detail of the desired content to the image creators of the replacement image.

The backend process then notifies a request component in the web server that an image placeholder has been created (step 1004). Upon receiving the notification, a request for a replacement image for the image placeholder is published (step 1006). The request for a replacement image may be published in various ways. In one embodiment, the request may be sent over email or to a Rich Site Summary, RDF Site Summary, or Really Simple Syndication (various version names of RSS) feed (or other syndicate feed) to which image creators and image obtainers may subscribe. In a second embodiment, the request may be published by including metadata in HTML headers on the web page itself that indicate the need for a replacement image. The users' browsers may be modified or a browser plugin may be used to detect the metadata, allowing the user to see the need for the image and interact with the metadata. In a third embodiment, the request may be published by sending the request to a repository that users may view, such as a web forum.

When users receive the published request, a user may opt to fulfill the request by creating or obtaining the requested replacement image (step 1008). The users may also use the aggregated data provided with the published request to further determine the desired content of the replacement image. The user may then provide the requested replacement image to the publication system (step 1010), such as by uploading with a web form, File Transfer Protocol (FTP) client, email, etc. The content owner may be notified of the received file, such as via email, alerts in their publishing software, etc. Upon receiving the replacement image, the replacement image is examined, such as by image replacement requestor/responder 324 in FIG. 3 to verify that the content of the image meets specific criteria for the image and thus is a suitable replacement image for the image placeholder (step 1012). This examination may be performed automatically based on the specified criteria or rules, or may be performed in a manual review(i.e., via user confirmation of content), or a combination of both. Examples of automation include calculation to detect adherence of the replacement image to size or resolution dimensions of the requested image, parsing text in the replacement image via Optical Character Recognition (OCR) and analysis of words in the replacement image for conformity to the requested image and/or conformity to "safe" words, and parsing the replacement image for image pattern recognition, such as to detect if the replacement image does or does not contain a person, specific colors, or a specific object in accordance with the requested image. Such parsing techniques are known in the art.

A determination is then made as to whether the image passes the examination (step 1014). If the image has not passed the examination ('no' output of step 1014), the image replacement requestor/responder 324 in FIG. 3 rejects the replacement image (step 1016), and the process continues to step 1020. However, if the image has passed the examination ('yes' output of step 1014), the image replacement requestor/responder 324 in FIG. 3 may replace the image placeholder at the file system location with the replacement image (step 1018). Thus, the replacement image may now be loaded with the web page rather than the image placeholder when the web page is requested by an application. The image replacement requestor/responder then updates the image placeholder log with the replacement image information and send a request to the web publication system and the notification server to delete or toggle the status of the request (step 1020), with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable device can be any tangible apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable device include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing web page images, said method comprising:

detecting, by one or more processors, that a modification has been made to a web page, said modification being an update of an image link on the web page, said web page including a list of links, said list of links including the image link, each link of the list of links specifying a path to an associated location at which a respective image is located in a file system;

in response to said detecting that the modification has been made to the web page, determining, by the one or more processors, whether the list of links on the web page identifies any new images to process and in response ascertaining, by the one or more processors, that the list identifies a first new image to process, wherein a first link included in the list includes a path pointing to a first location in the file system for locating the first new image;

in response to said ascertaining, selecting, by the one or more processors, the first link in the list;

attempting but failing, by the one or more processors, to retrieve an image from the first location pointed to by the path included in the first link;

in response to said attempting but failing, creating, by the one or more processors, an image placeholder that comprises each characteristic of a plurality of characteristics required of an image placeholder, said plurality of characteristics required of an image placeholder comprising a first characteristic of a size of the image placeholder and a second characteristic whose value matches a value obtained from execution of specified code;

storing, by the one or more processors, the image placeholder at the first location;

in response to said storing the image placeholder at the first location, publishing, by the one or more processors, a request for a replacement image to replace the image placeholder at the first location, said request specifying that the replacement image must have specified resolution dimensions;

receiving, by the one or more processors, the replacement image in response to said publishing the request, the replacement image;

determining, by the one or more processors, that the replacement image is a suitable replacement for the image placeholder, including determining that the replacement image has the specified resolution dimensions; and in response to said determining that the replacement image is a suitable replacement for the image placeholder, replacing, at the first location by the one or more processors, the image placeholder with the replacement image.

2. The method of claim 1, wherein the size of the image placeholder is a 1 pixel by 1 pixel size.

3. The method of claim 1, wherein the image failed to be retrieved from the first location has a file name, and wherein the method further comprises:

assigning a name to the image placeholder such that the assigned name is the file name of the image failed to be retrieved from the first location.

4. The method of claim 1, wherein the method further comprises:

retrieving a first image from the first location;

determining, from a comparison of the retrieved first image with the plurality of characteristics required of the image placeholder, that the retrieved first image comprises each characteristic of the plurality of characteristics; and in response to having determined that the retrieved first image comprises each characteristic of the plurality of characteristics, determining from content in a table listing methods applicable to the retrieved first image that one or more methods of the methods listed in the table are enabled, and in response, implementing each method of the one or more methods with respect to the retrieved first image, wherein the first image is the replacement image.

5. The method of claim 4, wherein the method further comprises:

in further response to having determined that the retrieved first image comprises each characteristic of the plurality of characteristics, determining from additional content in the table listing methods applicable to the retrieved first image that at least one of the methods listed in the table is not enabled.

6. The method of claim 4, wherein a characteristic of the plurality of characteristics is that a filename of the retrieved first image does not match a specified filename.

7. The method of claim 4, wherein the one or more methods include a method for logging requests for the retrieved first image, and wherein the method for logging requests for the retrieved first image comprises:

determining that a total number requests for the retrieved first image exceeds a specified threshold number, and in response, sending a notification that the threshold has been exceeded and subsequently increasing the threshold number.

8. The method of claim 4, wherein the one or more methods include a method for including notification text at a location in the web page where the image failed to be retrieved from the first location would have been placed if retrieved, and wherein the notification text relates to the failing to retrieve the image from the first location.

9. The method of claim 4, wherein the one or more methods include a method for determining when the replacement image exists in the file system.

10. A computer program product, comprising one or more computer readable hardware storage devices having computer readable program code stored therein, said program code containing instructions executable by one or more processors of a data processing system to implement a method for managing web page images, said method comprising:

detecting, by the one or more processors, that a modification has been made to a web page, said modification being an update of an image link on the web page, said web page including a list of links, said list of links including the image link, each link of the list of links specifying a path to an associated location at which a respective image is located in a file system;

in response to said detecting that the modification has been made to the web page, determining, by the one or more processors, whether the list of links on the web page identifies any new images to process and in response ascertaining, by the one or more processors, that the list identifies a first new image to process, wherein a first link included in the list includes a path pointing to a first location in the file system for locating the first new image;

in response to said ascertaining, selecting, by the one or more processors, the first link in the list;

attempting but failing, by the one or more processors, to retrieve an image from the first location pointed to by the path included in the first link;

in response to said attempting but failing, creating, by the one or more processors, an image placeholder that comprises each characteristic of a plurality of characteristics required of an image placeholder, said plurality of characteristics required of an image placeholder comprising a first characteristic of a size of the image placeholder and a second characteristic whose value matches a value obtained from execution of specified code;

storing, by the one or more processors, the image placeholder at the first location;

in response to said storing the image placeholder at the first location, publishing, by the one or more processors, a request for a replacement image to replace the image placeholder at the first location, said request specifying that the replacement image must have specified resolution dimensions;

receiving, by the one or more processors, the replacement image in response to said publishing the request, the replacement image;

receiving, by the one or more processors, the replacement image in response to said publishing the request, the replacement image;

determining, by the one or more processors, that the replacement image is a suitable replacement for the image placeholder, including determining that the replacement image has the specified resolution dimensions; and in response to said determining that the replacement image is a suitable replacement for the image placeholder, replacing, at the first location by the one or more processors, the image placeholder with the replacement image.

11. The computer program product of claim 10, wherein the size of the image placeholder is a 1 pixel by 1 pixel size.

12. The computer program product of claim 10, wherein the image failed to be retrieved from the first location has a file name, and wherein the method further comprises:

assigning a name to the image placeholder such that the assigned name is the file name of the image failed to be retrieved from the first location.

13. The computer program product of claim 10, wherein the method further comprises:

retrieving a first image from the first location;

determining, from a comparison of the retrieved first image with the plurality of characteristics required of the image placeholder, that the retrieved first image comprises each characteristic of the plurality of characteristics; and in response to having determined that the retrieved first image comprises each characteristic of the plurality of characteristics, determining from content in a table listing methods applicable to the retrieved first image that one or more methods of the methods listed in the table are enabled, and in response, implementing each method of the one or more methods with respect to the retrieved first image, wherein the first image is the replacement image.

14. The computer program product of claim 13, wherein the method further comprises:

in further response to having determined that the retrieved first image comprises each characteristic of the plurality of characteristics, determining from additional content in the table listing methods applicable to the retrieved first image that at least one of the methods listed in the table is not enabled.

15. The computer program product of claim 13, wherein a characteristic of the plurality of characteristics is that a filename of the retrieved first image does not match a specified filename.

16. A data processing system, comprising one or more processors, one or more memories, and one or more computer readable hardware storage devices, said one or more hardware storage device containing program code executable by the one or more processors via the one or more memories to implement a method for managing web page images said method comprising:

detecting, by one or more processors, that a modification has been made to a web page, said modification being an update of an image link on the web page, said web page including a list of links, said list of links including the image link, each link of the list of links specifying a path to an associated location at which a respective image is located in a file system;

in response to said detecting that the modification has been made to the web page, determining, by the one or more processors, whether the list of links on the web page identifies any new images to process and in response ascertaining, by the one or more processors, that the list identifies a first new image to process, wherein a first link included in the list includes a path pointing to a first location in the file system for locating the first new image;

in response to said ascertaining, selecting, by the one or more processors, the first link in the list;

attempting but failing, by the one or more processors, to retrieve an image from the first location pointed to by the path included in the first link;

in response to said attempting but failing, creating, by the one or more processors, an image placeholder that comprises each characteristic of a plurality of characteristics required of an image placeholder, said plurality of characteristics required of an image placeholder comprising a first characteristic of a size of the image placeholder and a second characteristic whose value matches a value obtained from execution of specified code;

storing, by the one or more processors, the image placeholder at the first location;

in response to said storing the image placeholder at the first location, publishing, by the one or more processors, a request for a replacement image to replace the image placeholder at the first location, said request specifying that the replacement image must have specified resolution dimensions;

receiving, by the one or more processors, the replacement image in response to said publishing the request, the replacement image;

receiving, by the one or more processors, the replacement image in response to said publishing the request, the replacement image;

determining, by the one or more processors, that the replacement image is a suitable replacement for the image placeholder, including determining that the replacement image has the specified resolution dimensions; and in response to said determining that the replacement image is a suitable replacement for the image placeholder, replacing, at the first location by the one or more processors, the image placeholder with the replacement image.

17. The data processing system of claim 16, wherein the size of the image placeholder is a 1 pixel by 1 pixel size.

18. The data processing system of claim 16, wherein the image failed to be retrieved from the first location has a file name, and wherein the method further comprises:

assigning a name to the image placeholder such that the assigned name is the file name of the image failed to be retrieved from the first location.

19. The data processing system of claim 16, wherein the method further comprises:

retrieving a first image from the first location;

determining, from a comparison of the retrieved first image with the plurality of characteristics required of the image placeholder, that the retrieved first image comprises each characteristic of the plurality of characteristics; and in response to having determined that the retrieved first image comprises each characteristic of the plurality of characteristics, determining from content in a table listing methods applicable to the retrieved first image that one or more methods of the methods listed in the table are enabled, and in response, implementing each method of the one or more methods with respect to the retrieved first image, wherein the first image is the replacement image.

20. The data processing system of claim 19, wherein the method further comprises:

in further response to having determined that the retrieved first image comprises each characteristic of the plurality of characteristics, determining from additional content in the table listing methods applicable to the retrieved first image that at least one of the methods listed in the table is not enabled.

* * * * *